July 4, 1961 E. HOSE 2,991,462

PHASE-TO-DIGITAL AND DIGITAL-TO-PHASE CONVERTERS

Filed March 6, 1959 5 Sheets-Sheet 1

INVENTOR.
Eddy Hose

BY Hugh L. Miller Jr.

July 4, 1961 E. HOSE 2,991,462

PHASE-TO-DIGITAL AND DIGITAL-TO-PHASE CONVERTERS

Filed March 6, 1959 5 Sheets-Sheet 2

INVENTOR.
Eddy Hose
BY Hugh L. Millis Jr.

July 4, 1961 E. HOSE 2,991,462

PHASE-TO-DIGITAL AND DIGITAL-TO-PHASE CONVERTERS

Filed March 6, 1959

5 Sheets-Sheet 3

INVENTOR.
Eddy Hose
BY Hugh S. Mills Jr.

July 4, 1961 E. HOSE 2,991,462

PHASE-TO-DIGITAL AND DIGITAL-TO-PHASE CONVERTERS

Filed March 6, 1959 5 Sheets-Sheet 4

INVENTOR.

Eddy Hose

BY Hugh L. Milligan

July 4, 1961 E. HOSE 2,991,462
PHASE-TO-DIGITAL AND DIGITAL-TO-PHASE CONVERTERS
Filed March 6, 1959 5 Sheets-Sheet 5

INVENTOR.
Eddy Hose
BY Hugh L. Millis Jr.

2,991,462
Patented July 4, 1961

2,991,462

PHASE-TO-DIGITAL AND DIGITAL-TO-PHASE CONVERTERS

Eddy Hose, San Diego, Calif., assignor to Cubic Corporation, San Diego, Calif., a corporation of California Filed Mar. 6, 1959, Ser. No. 797,660
18 Claims. (Cl. 340—347)

The present invention relates to electronic phase-to-digital and digital-to-phase converters, and, more particularly, to electronic devices capable of producing a binary number whose magnitude represents the phase difference between a pair of applied signals and a pair of signals whose phase difference corresponds to the magnitude of a given binary number.

In applying digital computation techniques to control situations, it is generally necessary to take one or more input analog parameters and produce binary numbers whose magnitudes correspond to the respective analog values. Then, after completion of a series of binary computations, involving additions, subtractions, multiplications, divisions, etc., control information is derived in binary number form. Next, the binary numbers resulting from the computations must be converted into an analog form suitable for application to the various amplifiers, etc., associated with the various output actuators.

Consider, by way of example, that the input analog information appears in the form of shaft positions, such as produced by compasses, barometric altimeters, gyro pick-offs, etc., and that the magnitudes of these shaft positions are to be entered into a digital control computer as corresponding binary numbers. One commonly employed method, continuing the example, is to transfer all of the shaft positions to the same location by employing synchro repeater techniques. Then, a binary coded disc would be coupled to each synchro transformer shaft, and servo amplifier systems would be employed to drive each disc position to exact coincidence with its corresponding instrument shaft position. The servo amplifiers are required to overcome the basic inertia of binary coded discs and thereby maintain exact displacement correspondence between each instrument and coded disc pair in order that no appreciable time lag is involved in each binary number computer entry.

This type of conversion approach, although providing a conversion of sufficient accuracy, requires equipment of considerable size and complexity, since synchro repeaters, servo amplifiers, auxiliary disc pick-off equipment, etc., must be provided. In fact it is not unusual in some applications, to find that the total amount of input equipment is considerably larger than the computer itself and this factor acts to impose an undue limitation on the number of inputs that can be readily handled, and hence the amount of computation that can be performed.

The present invention deals with a technique offering phase-to-digital conversion and digital-to-phase conversion that is entirely electronic in nature and requires, unlike the previous example, no mechanical components, servo drives, etc. Accordingly, it offers a considerable advantage over the prior-noted approach in the matter of size, power requirements, complexity, etc., without, however, as will be later seen, a corresponding degradation of basic conversion accuracy.

In particular, before considering the different conversion embodiments of the present invention, it is desirable to establish one basic combination of circuit elements which is then employed in different combinations to obtain the various embodiments. This combination comprises a serially-connected phase discriminator, compensating amplifier, voltage-controlled oscillator and a binary flip-flop counter. An input signal is coupled to one terminal of the phase discriminator, and a signal, taken from the final flip-flop in the counter, is applied to the other input terminal of the discriminator. The discriminator output signal is a function of the phase difference between the flip-flop and input signal, and is employed to drive the oscillator output frequency to a value such that the phase of the final counter flip-flop signal, representing the counted down oscillator signal, corresponds to the incoming signal phase. At null, that is, at a 90° signal phase difference measured at the two discriminator input terminals which, in turn, corresponds to a zero discriminator output signal, the binary number count in the counter will follow exactly the phase of the input signal. That is, as it crosses zero, say positively, the count in the counter will be zero, while, as it crosses zero in a negative direction, the count in the counter will be exactly one-half of its full capacity. In this way, the magnitude of the count will always represent the phase of the input signal measured past its last positive-going zero cross-over point and will recycle to zero, that is, go from all 1's to 0's at each of the zero cross-over points.

One embodiment of the present invention employs this basic circuit configuration for providing an output signal of either a square or rectangular waveform which rises to a high level at any predetermined time or phase interval at or after the zero cross-over point of the input signal and then falls to a low voltage level at a second predetermined time interval after its rise. This function is provided by a first series of switches coupled between the series of flip-flops in the counter and an "and" gating circuit. Then, by selectively throwing the switch arms of the switches to represent a binary number whose magnitude represents the desired phase delay after the zero signal cross-over point, a triggering impulse is supplied by the "and" circuit to the set input terminal of an output flip-flop which is thereby triggered "on." Then, a second series of switches, connected between the series of flip-flop and another "and" gate, may have their individual switch arms thrown to correspond to another binary number. Accordingly, when this other number is attained by the counter, the associated "and" circuit supplies a triggering signal to the reset input terminal of the output flip-flop, and this flip-flop is accordingly zeroed. If the second series of switch arms is thrown to represent a number magnitude greater, by one-half of the counter capacity, then the first switch number, the duration of the high voltage level in the output flip-flop signal, will equal the low voltage level portion and hence will be of a square waveform. This output square wave signal will exhibit an exact phase difference from the incoming signal according to the preselected binary value determined by the positions of the first series of switches.

Another embodiment of the present invention employs two of the discriminator, oscillator and binary counter combinations in order to produce a shaft-position-to-digital-number conversion. In this embodiment, the unknown shaft position is coupled to a resolver which, in turn, is electrically connected as a linear phase shifter. A reference sginal is then passed through the resolver and undergoes a phase shift directly related to the shaft displacement. This delayed signal is then applied to one of the discriminator-oscillator-counter combinations with the result that the magnitude of the counter number represents, at all times, the phase angle of the resolver-passed signal after its last positive-going zero cross-over point. In this same way, the reference signal is applied to the other combination and the count in its respective counter at any instant represents the magnitude of the phase angle occurring after the last zero cross-over of the reference signal. The difference in magnitudes between the two counts, at any instant, represents the original shaft displacement. A specific type of readout technique is also shown in which, following a command signal, the zero cross-over of one signal, recognized by a zero magnitude count in its respective counter, causes the count appearing simultaneously in the other counter to be transferred, in parallel, to a storage register. The transferred number accordingly represents the difference in the two counts and hence the shaft displacement.

A final and much more complex embodiment is shown which performs a phase-to-digital conversion in which the resulting binary number has considerably more significant digits, for resolution and accuracy purposes, than the conversion made by the prior-noted technique. In this embodiment, a pair of resolvers are employed, one of which, the Fine channel resolver, is connected directly to the shaft whose position conversion is desired, and the other, the Coarse channel resolver, is connected to the shaft through a speed-reduction gear box. A reference signal is applied across both resolvers and each of the resolver-passed signals and the reference signal are coupled into respective discriminator-oscillator-counter combinations of the type described previously. Since the gear box placed between the original shaft and second resolver shaft is assumed to have backlash, the stages of the two counters are so arranged relative to the gear-down ratio that a few of the most significant digits of the Fine channel counter and the least significant digits of the Coarse channel counter overlap each other.

The basic requirement of the remaining portion of the circuitry is to serially combine the Fine and Coarse channel readings, considered with the reference channel reading, so as to acquire a single binary number whose magnitude represents the over-all shaft displacement. This is done by, first of all, subtracting the reference channel counter digits from the Fine channel digits to obtain a number representing the phase displacement of the Fine channel resolver and, similarly, subtracting the reference channel reading from the Coarse channel counter digits to obtain a number representing the Coarse channel resolver phase displacement. The resulting two number magnitudes correspond to the absolute displacements of their respective resolver shafts, but will also include a number of overlapping digits to accommodate possible gear train backlash effects. Since backlash in the gear reduction box will affect the Coarse channel reading only, and since a serial type of readout is desired for equipment saving purposes, it is necessary to pass out the Fine channel digits first, and based on the respective values of the overlapping digits in the two channels, correct the remaining Coarse channel digits as they later appear, also in serial fashion. This is accomplished by subtracting the Coarse channel digits from correspondingly valued Fine channel digits and then adding the subtracted results to the Coarse channel digits. In this way, the most significant digits of the Coarse channel reading are automatically corrected for backlash conditions, and a single number obtained from the combination which contains considerably more significant digits, and hence more accuracy and resolution, than is possible by the single channel conversion embodiment noted earlier.

It is thus seen that the various embodiments of the present invention provide an all-electronic technique for converting shaft positions into binary numbers and thereby avoid the difficulties present in the technique, noted above, wherein synchro repeaters, amplifiers, binary coded discs, etc., are employed. Also, higher conversion accuracies and resolutions are obtainable by employing the conversion techniques according to the present invention than are obtainable by another well-known and widely employed technique wherein a potentiometer is coupled to each shaft of interest, and a voltage proportional to the shaft displacement is obtained from the potentiometer. Then the picked-off voltage is applied to any one of the numerous commercially available voltage-to-digital conversion devices and the subsequently produced binary number applied to the computer. All of such conversion devices are highly costly and complex, and the accuracy obtainable is inherently limited both by the linearity of the potentiometer employed and the voltage-to-digital conversion device.

It is, accordingly, the principal object of the present invention to provide electronic devices capable of performing phase-to-digital and digital-to-phase conversions.

Another object of the present invention is to provide an electronic device presenting a varying binary count whose magnitude at any instant represents the phase of an input periodically varying signal measured from one of its previous zero voltage cross-over points.

Still another object is to control the frequency of a variable frequency oscillator such that its frequency, after being counted down by a binary flip-flop counter, is phase correlated with an incoming signal.

A further object of the present invention is to provide an electronic device responsive to the frequency of an input signal for multiplying the input signal frequency a number of times, counting down the multiplied signal frequency to the input signal frequency, and then modifying the degree of frequency multiplication until a predetermined constant phase relationship is established between the input signal and the counted down signal frequency.

Another object of the present invention is to provide an electronic device for producing an output indication whenever the phase of an incoming sinusoidal signal attains a predetermined phase, each cycle following one of its zero cross-over points.

Still another object of the present invention is to provide an electronic circuit capable of indicating to high accuracy and resolution a preselected portion of each cycle of an input sinusoidal signal.

A further object of the present invention is to provide an output two-level signal wherein one level of the signal represents a predetermined portion of each cycle of a periodically varying input signal.

A still further object of the present invention is to provide an electronic device capable of producing an output series of signals representing the digits of a binary member whose magnitude, in turn, corresponds precisely to the angular position of an input shaft.

Another object of the present invention is to provide an electronic device responsive to an input signal for multiplying the frequency of the input signal, counting down the multiplied signal frequency in a binary counter a predetermined number of times such that the counted down signal frequency normally equals the input signal frequency, and then modifying the degree of frequency multiplication until a predetermined constant phase relationship is established between the input signal and the counted down signal frequency, whereby the count in the counter at any instant represents the phase interval in each input signal cycle after one of its previous zero signal cross-over points.

A further object of the persent invention is to provide an electronic device for producing a binary number representing the displacement of an input shaft by delaying the phase of a reference signal an amount corresponding to the shaft displacement and producing a pair of continuously changing binary numbers whose instantaneous magnitudes represent the phase of the reference and shaft delayed reference signals, respectively, after their last zero cross-over points and, upon demand, effectively subtracting one binary number from the other to produce a third binary number representing the shaft displacement.

A still further object of the present invention is to provide an electronic device for producing a binary number representing the displacement of an input shaft by delaying the phase of a reference signal an amount corresponding to the shaft displacement and producing a pair of continuously changing binary numbers whose instantaneous magnitudes represent the phase of the reference and shaft delayed reference signals, respectively, after their last zero cross-over points, and, upon demand, reading out one binary number when the other binary number goes through zero magnitude to produce a third binary number whose magnitude represents the shaft displacement.

Another object of the present invention is to provide a device for producing a binary number whose magnitude represents the displacement of an input multi-turn shaft, the input shaft being geared down to rotate at least within one turn, but producing first and second binary numbers whose magnitudes represent the displacement of the input and geared-down shafts, respectively, and combining the first and second binary numbers to form a third binary number whose magnitude represents the total displacement of the input shaft.

Still another object of the present invention is to provide a device for producing a binary number whose magnitude represents the displacement of an input multi-turn shaft, the input shaft being geared down to rotate within at least one turn, by delaying a reference signal an amount corresponding to both the input and geared-down shaft positions, producing three simultaneous binary numbers whose values at any instant represent the phase appearing after the last zero cross-over point of the reference input, shaft delayed, and geared-down shaft delayed reference signals, respectively, subtracting the reference binary number from each of the input shaft related and geared-down shaft related binary numbers to produce first and second binary numbers, respectively, whose values are related to the input and the geared-down shaft positions, and finally combining the first and second binary numbers to produce a third binary number whose magnitude represents the total displacement of the input shaft.

Still another object of the present invention is to provide a device for producing a binary number whose magnitude represents the displacement of an input multi-turn shaft, the input shaft being geared-down by a gearing mechanism having backlash characteristics to rotate at least within one turn, by producing first and second binary numbers whose magnitudes represent the displacement of the input and geared-down shafts, respectively, the most significant digits of the input shaft related binary number overlapping in value the least significant digits of the geared-down shaft related binary number an amount corresponding at least to the maximum backlash effects in the gearing mechanism, and forming a portion of a third binary number directly from the first binary number and the remaining portion of the third binary number from the second binary number as corrected, for backlash effects, in accordance with the values of the overlapping digits of the first and second binary numbers, whereby the third binary number magnitude represents the total displacement of the input shaft.

Other objects, features and attendant advantages of the present invention will become more apparent to those skilled in the art as the following disclosure is set forth including a detailed description of a preferred embodiment of the invention as illustrated in the accompanying sheets of drawings, in which.

Figure 1:
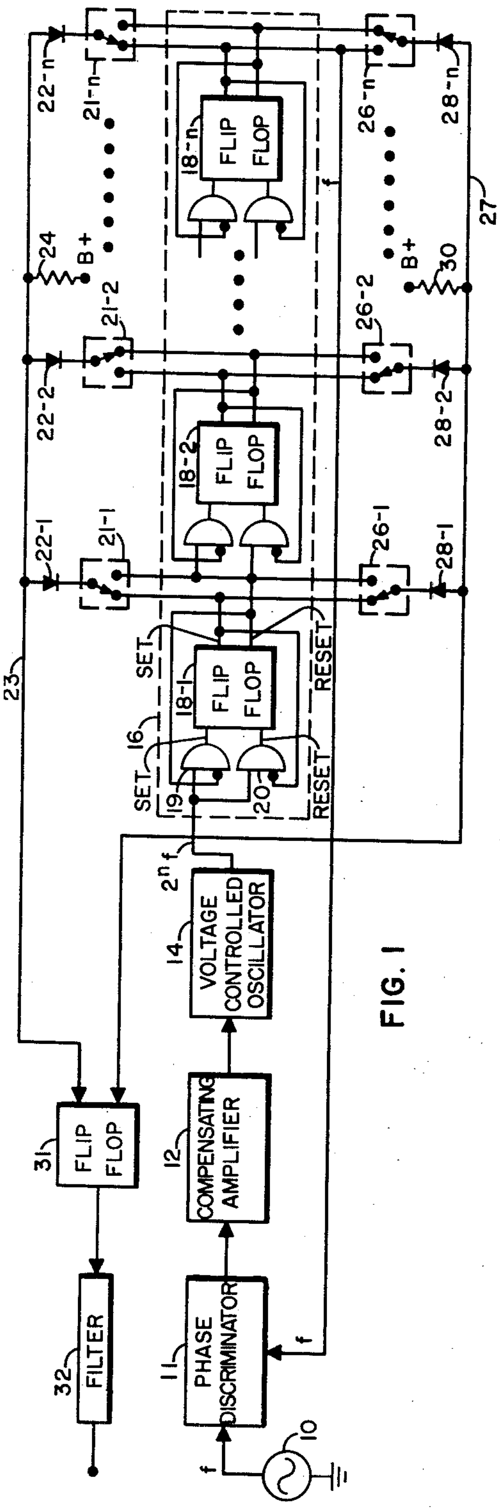
FIGURE 1 is a block diagram of an analog-to-digital and digital-to-analog converter according to the present invention.

Referring now to the drawings, wherein the same elements are given identical numerical designations throughout the several figures, there is illustrated in FIGURE 1 a combined zero signal cross-over indicator and digital-to-phase converter according to one aspect of the present invention. The input signal to this embodiment appears on one output terminal of a source 10 of alternating current potential, the other output terminal of source 10 being grounded. This source 10 output signal is applied to one input terminal of a phase discriminator 11, while the output signal of discriminator 11 is applied serially through a compensating amplifier 12 to control the frequency of a voltage-controlled oscillator 14, whose output signal, in turn, is applied to the input stage of a binary flip-flop counter 16. Counter 16 comprises $n$ serially-connected flip-flops, designated 18–1, 18–2, etc., through 18–$n$, the last or final stage.

In considering the detailed counter connections, the oscillator 14 output signal is applied to one input terminal of each of a pair of input "and" circuits 19 and 20, in turn connected to the set and the reset input terminals, respectively, of the first flip-flop 18–1. The upper or set output terminal of flip-flop 18–1 is connected to the other input terminal of "and" circuit 20, while its lower or reset output terminal is coupled to the other input terminal of "and" circuit 19. The reset terminal of flip-flop 18–1 is also connected to one input terminal of each of a pair of two-terminal "and" gate circuits, similar to circuits 19 and 20, which are connected to the set and reset input terminals of flip-flop 18–2, respectively. Flip-flop 18–2 is connected similarly to flip-flop 18–1, as are all of the remaining flip-flops, not specifically illustrated.

The set output terminal of flip-flop 18–1 is connected to one fixed contact point of each of a pair of single-pole, double-throw switches 21–1 and 26–1, respectively, while its reset output terminal is connected similarly to the other fixed contact point of each of switches 21–1 and 26–1. The movable switch arm of switch 21–1 is connected through a diode 22–1 to a common line 23 and from there through a resistor 24 to the positive terminal designated B+, of a source of potential, not specifically shown. In the same way, the movable switch arm of switch 26–1 is connected through a diode 28–1 to another common line 27, in turn connected through a resistor 30 to the B+ terminal. The set and reset output terminals of the remaining flip-flops, 18–2 through 18–$n$, are connected to corresponding switches, similar to 21–1 and 26–1 as described for flip-flop 18–1. Each of the remaining switches, in turn, is coupled through a corresponding diode to its associated common line.

The set output terminal of the final flip-flop stage 18–$n$ in binary counter 16 is connected to the other input terminal of phase discriminator 11. Common line 23 is coupled to the set input terminal of another flip-flop 31, while common line 27 is coupled to the reset terminal of flip-flop 31. Finally, the output signal of flip-flop 31, appearing on its set output conductor, is passed through a filter 32.

The basic operation of the FIGURE 1 circuitry is best explained in terms of the combined operation of phase discriminator 11, voltage-controlled oscillator 14 and counter 16. Briefly, voltage-controlled oscillator 14 produces an output signal whose frequency is controlled to be $2^n$ times the incoming signal frequency from source 10. Counter 16, of $n$ stages, counts the oscillator signal frequency down by a factor of $2^n$ so that its output signal will then correspond to the source 10 frequency. Phase discriminator 11 produces an output D.-C. voltage whose polarity and magnitude reflect the phase difference in direction and magnitude, respectively, between the feedback signal from the last stage of counter 16 and the source 10 signal. This D.-C. signal, then, in being applied to oscillator 14, causes the oscillator signal frequency to be increased or decreased, as the case may be, so that phase correlation between the counter output and source 10 signals is effected.

Having considered the basic operation of the circuitry, various aspects of its detailed design may now be considered. Phase discriminator 11 may be any one of a number of well known types, but is preperably of the area type rather than the peak reading variety. This preference is based on the fact that any noise appearing in the input signal from source 10 is more nearly averaged out by the area type of discriminator, since the areas of the 90° phase portions appearing before and after the zero cross-over in each cycle of the incoming sine wave are averaged. The peak reading type of discriminator, on the other hand, essentially samples the peak of each cycle in the incoming signal and hence will include, in its reading, any noise appearing at the instant of sampling. Accordingly, noise will be averaged out only over a large number of cycles in the peak reading type, as opposed to a noise averaging in each cycle in the area type.

Voltage-controlled oscillator 14 may be formed, for example, by a reactance tube whose reactance value is controlled by the magnitude of an applied D.-C. signal, as from amplifier 12 in the present circuit, and whose value, in turn, instantaneously controls the frequency of a tuned oscillator. On the other hand, it may comprise a free-running multivibrator whose oscillating frequency is dependent upon the magnitude of an incoming voltage. As will be appreciated, if a reactance tube and oscillator combination is employed, appropriate shaping and amplifying circuits will be employed as a portion of its output circuit in order to modify the normally produced sinusoidal waveform to a shape suitable for triggering the first stage flip-flop 18–1 of binary counter 16.

Regardless of the particular form taken by voltage-controlled oscillator 14, it will, as will be appreciated, be capable of having its frequency varied within certain limits, say ±20%, and its approximate middle frequency should be in the neighborhood of $2^n f$, when $f$ is the normal frequency of the source 10 signal.

Compensation amplifier 12 is primarily a combined amplifier and filter and serves to smooth or average the D.-C. signal coming from phase discriminator 11. This feature is particularly important if the incoming signal is subject to drop-out or random disturbances in order that the last-sensed frequency value of oscillator 14 be maintained until a normal input signal again appears.

The flip-flops constituting binary counter 16 may take any one of a number of well known forms as employed in the digital computer art. In the connections shown, the set and reset input terminals of each flip-flop are preceded by a pair of corresponding "and" gating circuits and it is herein assumed that the flip-flop type employed will be triggered by a positive-going input signal. Accordingly, to achieve a binary counting chain, it is necessary to connect the reset output terminal of each flip-flop to the pair of "and" circuits associated with the input terminals of the next following flip-flop. With these connections made, if it is assumed that flip-flop 18–1 advances from its 1 to 0, or "on" to "off" condition, represented by the signal appearing on its set output terminal going from a relatively high to a relatively low voltage level, then the corresponding signal on its reset output terminal will go from a low to a high voltage level. This positive-going reset signal, then, will cause flip-flop 18–2 to reverse its conduction state, since, whichever flip-flop 18–2 input "and" circuit has a cross-coupled high voltage level applied to it, will receive a positive-going input signal which will then be applied to its associated input flip-flop terminal. Accordingly, it is seen that each flip-flop in counter 16 will be triggered to reverse its conduction state once for each complete cycle, corresponding to two conduction state reversals, made by the preceding flip-flop. Hence, since $n$ flip-flops are employed, the final flip-flop 18–$n$ output signal will produce one complete cycle for each $2^n$ cycles made by the first flip-flop 18–1 signal.

Figure 2:
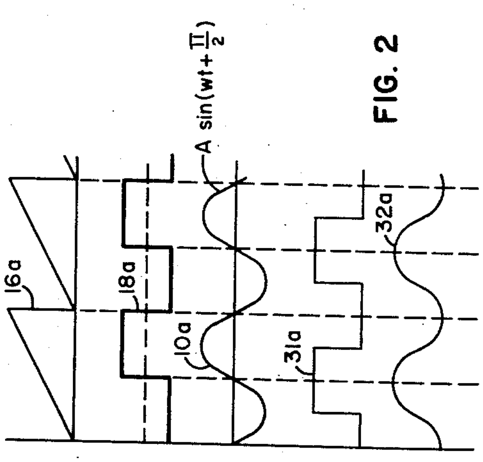
FIGURE 2 shows a group of signal waveforms and a changing binary number magnitude for illustrating the operation of the FIGURE 1 converter.

In FIGURE 2 is shown a group of signal waveforms as they appear by way of example in the FIGURE 1 circuitry, and also included, at 16$a$, is a representation of the magnitude of the count stored in counter 16, plotted against time during a pair of overflow cycles. In particular, just after overflow, that is one count following the cycle in the oscillator 14 signal that all of the counter flip-flops are at their set or "1" state, all flip-flops revert to their reset or "0" state, yielding an over-all count value of zero. Then, in accordance with the counting operation, the magnitude of the count increases uniformly until the next overflow, etc. Hence, the sawtooth type of waveform at 16$a$ results.

Curve 18$a$ represents the conduction state or count of final flip-flop 18–$n$, which will be zero for the first half of the incoming counts during a complete cycle and at its "1" or set state during the final half of the counting cycle. It is this signal waveform that is applied to phase discriminator 11 and, also shown at 10$a$ is a sine wave input from source 10 but displaced 90° from its true position for the purposes of illustrating phase coincidence. In other words, phase discriminator 11, regardless of whether it is of the area or peak reading type, produces a zero valued output signal only when the phase difference between its two input signals is exactly 90° apart. Thus, as is evident from FIGURE 2, a null condition exists whenever the phase difference between the 90° displaced signal 10$a$ and signal 18$a$ are exactly related.

The resolution, or degree of fineness, to which phase difference between the input and feedback signals can be established by the FIGURE 1 circuitry is primarily a function of the number of stages in the counter. If a 10-stage counter were employed, then exactly $2^{10}$ or 1024 counts would occur between overflows, and phase coincidence between the output signal and the input signal could be located to 1 part in 1024, the conduction state resolution offered by the least significant digit count in the counter, or flip-flop 18–1.

The series of switches number 21 and their corresponding series of 22 numbered diodes, along with resistor 24 and common line 23 form an "and" gating circuit, hereafter termed "and" circuit 23, which serves to deliver a positive-going signal whenever the series of flip-flop output leads connected by the switches are simultaneously at their high voltage level. In the same way the 26 numbered series of switches, the 28 numbered series of diodes, common line 27, etc., form another "and" circuit, hereafter termed "and" circuit 27, similar to circuit 23, which produces a positive-going or high voltage level whenever the flip-flop output terminals selected by the series of switch 26 contact positions, are simultaneously high.

Flip-flop 31 is triggered to its set condition by the output signal of "and" circuit 23 going to its high level and is reset to its zero value by the output signal of "and" circuit 27 going to its high value. Since the two sets of switches and related "and" circuits are associated with the flip-flop output terminals in counter 16, the high voltage level produced by each "and" circuit will occur when the binary number corresponding to its series of switch settings is attained by the counter. Hence, the settings of the individual switches in the two sets of switches correspond to a pair of binary numbers and flip-flop 31 is triggered "on" by the number selected by the 21 numbered series of switch positions, and is triggered "off" by the number selected by the 26 numbered series of switch contact positions.

Assuming, for example, that an indication is desired of the 90° phase angle point following each negative-going zero cross-over point made in each cycle by the source 10 output signal, then the "and" circuit 23 switches should be set to correspond to a zero-valued number, as by throwing each switch contact arm to its right-hand position in order that the reset terminals of the series of flip-flops will be connected to "and" circuit 23. With this series of connections made, as the counter flip-flops turn from all ones to all zeros, as they will during the time the counter recycles at the end of each cycle, the reset terminal signals will change simultaneously from their low to high voltage levels and a positive-going signal is applied by circuit 23 to the set terminal of flip-flop 31.

Now, by throwing the switch arms of the switches, except the first switch 26–1, associated with "and" circuit 27 to their right-hand position, switch 26–1 being thrown to its left-hand position, a positive-going signal will be produced by "and" circuit 27 when the count in the counter shifts from 00 . . . 00 to 00 . . . 01, where the "1" relates to the value of the least significant flip-flop 18–1. The over-all result obtained is that flip-flop 31 would be turned on for a single cycle measured by the output signal of oscillator 14 and would be low for the remaining portion of a source 10 signal cycle. Also, since the feedback loop, including the operation of counter 16, is relatively isolated from any noise appearing in the source 10 signal, the 90° point thus indicated will be presented to a resolution and accuracy determined by, as noted previously, the total number of stages in counter 16, or $2^n$. If the exact negative-going zero cross-over point of the source 10 signal is to be indicated, for example, then the 21–2 series of switches would be set to a binary number whose value corresponds to three-fourths the total capacity of counter 16, with the 26–2 series of switches being set to a number of one digit higher value. The three-fourths value corresponds, from FIGURE 2, to the zero cross-over point of signal 10*a*, shown displaced, as noted previously, 90° to the right.

The example just presented can be extended so that any phase interval during a cycle in the source 10 signal can be represented by the high voltage level appearing in the output signal of flip-flop 31. This is accomplished by setting the contact arms in the two series of switches to correspond to the two phase angles, that the leading and trailing edges of the high voltage level produced by flip-flop 31 is to have. If the two numbers are separated by a magnitude corresponding to 180° of the cycle, then a digital-to-phase conversion will have been effected, as is illustrated in waveform 31*a*. Here, the 27 numbered series of switches are set, by way of example, to a number corresponding to the positive-going zero cross-over point in each source 10 cycle with signal 31*a* accordingly rising to its high voltage level at this point. If, for example, a ten-stage counter were employed, the number represented by the number 22 series of switches would be one-fourth of 1024, the total count capacity of counter 16, or 256. The zeroing point for flip-flop 31 would be ordered 180° later, by the numbered 26 series of switches, whose settings would correspond to three-fourths of the count capacity of counter 16, or 768, expressed in decimal number notation.

With these counting parameters established, the flip-flop 31 waveform exhibits a square wave configuration whose phase displacement from the originating source 10 signal is precisely governed by the magnitude of the number represented by the series of 27 numbered switch positions. It will be appreciated that any predetermined phase relationship betwen the source 10 and flip-flop 31 signals may be produced by the expedient of setting the desired phase difference as a number represented by the 22 numbered switch positions, and then setting the numbered 26 series of swicthes to a number corresponding to a half cycle, or 180° greater than the phase difference number. With such switch connections, flip-flop 31 will produce a continuous square wave having the pretermined or set-in phase relationship with the incoming signal. Hence, a phase relationship between the signals has been created based on the magnitude of a binary number.

Filter 32, of the low phase shift variety, is preferably designed to filter out all signal 31*a* harmonics to thereby pass signal 32*a* in FIGURE 2 of a sinusoidal form. It will be in exact phase with signal 31*a*, and hence possess the identical phase relationship with signal 10*a* as does signal 31*a*.

It will be appreciated by those skilled in the art that the phase difference generated by the numbers represented by the two sets of switch arm connections, may be utilized in a number of ways. For example, it can be converted into a corresponding shaft position by driving a servo motor coupled to a resolver shaft such that the phase difference introduced by the resolver equals the phase difference between signals 10*a* and 32*a*. The resolver shaft position, at null, will correspond to the phase difference between the noted signals and hence to the magnitude of the number represented by the series 22 of switch positions.

Figure 3:
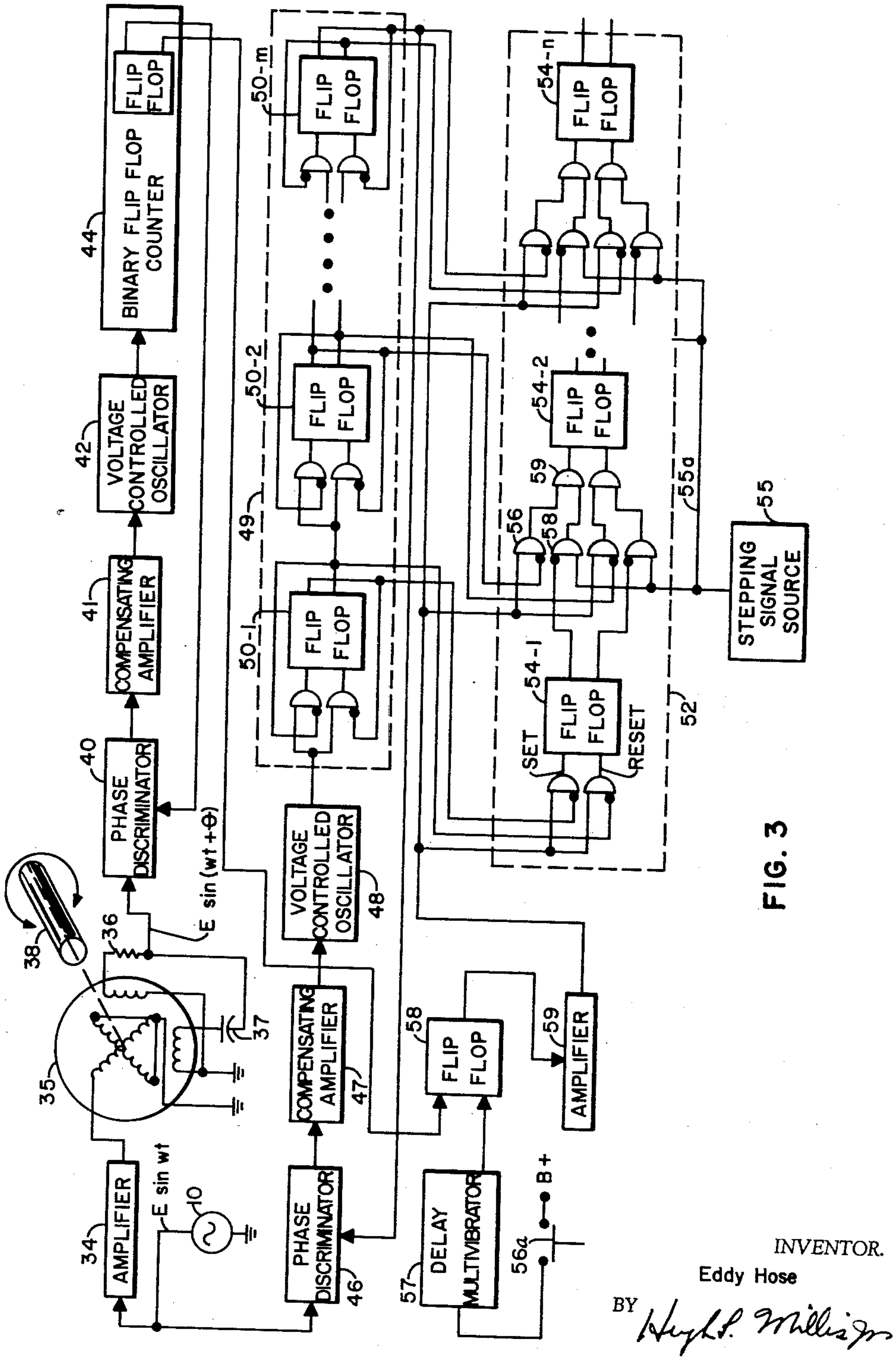
FIGURE 3 is a block diagram of a shaft-to-digital-number converter according to the present invention.

Referring now to FIGURE 3, there is illustrated a phase-to-digital converter in accordance with the present invention. Here, an input shaft 38 is coupled to the rotor of a resolver 35, while the output signal of source 10 is amplified by an amplifier 34 and applied to one end of one of the resolver 35 rotor windings. The other end of the rotor winding and the two ends of the other winding being connected to ground.

One end of each of the two stator windings of resolver 35 are connected together by a serially-connected resistor 36 and capacitor 37, while the other stator ends are connected to ground. The output signal from the resolver is taken from the common junction between resistor 36 and capacitor 37 and is applied to one input terminal of a phase discriminator 40. The output signal of phase discriminator 40 is coupled serially through a compensating amplifier 41 to a voltage-controlled oscillator 42, whose output signal is counted by a binary flip-flop counter 44, which may be similar to counter 16, shown previously in detail in FIGURE 1. The set output terminal signal of the final flip-flop within counter 44 is connected to the other input terminal of phase discriminator 40, as was the case in the FIGURE 1 circuitry.

The output signal from source 10 is also applied to one input terminal of another phase discriminator 46, whose output signal, in turn, is amplified by a compensating amplifier 47 and applied to the input terminal of another voltage-controlled oscillator 48. The output signal of oscillator 48 is applied to another binary flip-flop counter, shown here in detail at 49, which is similarly connected to the one shown and described previously in FIGURE 1, and including a series of flip-flops numbered 50–1, 50–2, etc. through **50–*n*. As was the case in the FIGURE 1 counter, the output signal from the set output terminal of the final stage flip-flop 50–*n* is applied to the other input terminal of phase discriminator 46**.

A readout register, shown at 52, serves, upon demand, to store a binary number whose magnitude corresponds to the phase difference between the input signals to counters 44 and 49 and, hence, the shaft 38 displacement. In particular, register 52 includes a series of flip-flops 54–1, 54–2, etc., through **54–*n*, corresponding to the series of counter 49 flip-flops. Considering the flip-flop 54–1 input connections first, the set output terminal of flip-flop 50–1 is connected to one input terminal of an "and" circuit connected to the flip-flop 54–1 set input terminal, while the flip-flop 50–1 reset output terminal is connected to one input terminal of an "and" circuit connected to the reset input terminal of flip-flop 54–1. The output line of amplifier 59 is connected to the other input terminal of each of the input "and" circuits of flip-flop 54–1**.

The input connections to all remaining flip-flops in register 52 are similar to each other, and flip-flop 54–2 being considered as an example, includes two "and" circuits and one "or" circuit associated with each of its input terminals. In particular, the set output conductor of flip-flop 50–2 and the parallel transfer line, coming from amplifier 59, are coupled to the two input terminals, respectively, of one "and" gating circuit 56. The set output terminal of the preceding flip-flop 54–1 and a stepping line **55*a*, coupled to the output terminal of a stepping signal source 55, are connected to the two input terminals of the other "and" circuit 58. The output terminals of "and" circuits 56 and 58 are connected to the two respective input terminals of a two-terminal "or" circuit 59, whose output signal, in turn, is applied to the set input conductor of flip-flop 54–2**.

The pair of "and" circuits and "or" circuits associated with the reset input terminal of flip-flop 54–2 are connected similarly to those associated with the set input terminal, except that the reset output terminals of flip-flop 50–2 and 54–1 are connected to the one input terminal of each of the "and" circuits with the parallel transfer line and series stepping line **55*a*** being respectively connected to the remaining input terminals.

Finally, the remaining circuitry includes a push-button, indicated generally at 56, connected between the positive or B+ terminal of a source of potential, not shown, and the input terminal of a delay multivibrator 57. The output signal of multivibrator 57 is applied to the reset terminal of a flip-flop 58, while the reset output terminal of the final flip-flop stage of binary counter 44 is coupled to the set input terminal of flip-flop 58. The set output signal of flip-flop 58 is amplified by an amplifier 59 and from there is applied to the remaining input terminal of each of the "and" circuits within register 52.

In operation, the magnitude of the count within binary counter 44 will, at any instant, represent the phase of the resolver 35 signal measured from the last zero cross-over point in its cycle, as explained previously for counter 16 in FIGURE 1. Resolver 35 is connected to form a linear phase shifter, that is, the phase change afforded its input signal from amplifier 34 to its output signal is directly proportional to the angular position of shaft 38, away from a null position. This linear phase shifting property is readily achieved by relating the values of capacitor 37 and resister 36 such that the capacitive reactance of the capacitor measured at the source 10 signal frequency is exactly equal to the resistance value of resistor 36.

In the same way, the magnitude of the count within counter 49 represents the phase, or, more precisely, the phase angle, of the source 10 signal after its last zero cross-over point. Accordingly, it is apparent that the difference between the counts existing at any instant in counters 44 and 49 represents the difference between the zero cross-over points of the source 10 signal and the resolver 38 phase delayed signal. The magnitude of such a count, therefore, corresponds to the phase difference between the signals.

Register 52 and the circuitry associated with it represent one technique of acquiring this binary number difference, corresponding to the phase displacement between the two signals. In particular, an output reading may be obtained by depressing push-button 56, which, in coupling the B+ terminal potential to delay multivibrator 57 causes its actuation. Operation of the multivibrator will, in turn, act both to reset flip-flop 58 and isolate its reset terminals from arcing, transients, etc., normally produced by a push-button depression. With flip-flop 58 in its reset condition, the set output terminal coupled to amplifier 59 will be at its normally low voltage level. Now, the next time binary counter 44 overflows or goes from its all-one count to all-zero count, the signal appearing on the reset terminal of its final flip-flop will go from its low to high voltage level and accordingly apply a positive-going signal or pulse on the set terminal of flip-flop 58, resulting, in turn, in a reversal of the flip-flop 58 conduction state. This reversal results in the signal applied to amplifier 59 going from the previously described low voltage level to its high voltage level with a positive pulse being thereby produced. Such an action serves to introduce the conduction state of each flip-flop within counter 49 into its associated or corresponding flip-flop within register 52, since this amplified positive pulse from flip-flop 58 is applied to each of the "and" circuits within register 52.

Now, since binary counter 44 is passing through zero at this instant, corresponding to the zero cross-over point of its associated input signal, the number appearing simultaneously in counter 49 will represent the magnitude of the phase difference between the two signals, and since it is this number which is stepped into register 52, the phase difference expressed in numerical form will be available for readout purposes. Also, since the phase delay in the source 10 signal was initially introduced by the action of resolver 35, the resulting number represents the shaft 38 position. Thus, a phase-to-digital conversion has been effected and the number represented by the output conduction state sequence of the register 52 flip-flops may then be read out and applied to a utilization device, such as a recorder or digital computer, etc. Readout may be accomplished in the figure by activating source 55 to apply stepping pulses on stepping conductor 55, which acts, in turn, to serially step the binary digits represented by the conduction states of the register 52 flip-flops to the right and out through the final flip-flop **54–*n***.

This stepping operation may be readily understood by observing the portion of the interconnections between flip-flops 54–1 and 54–2 associated with conductor **55*a*. Assume that stepping signal source 55 is actuated to produce a series of positive-going pulses for producing the stepping operation. As will be appreciated, source 55 can be controlled by the utilization or readout device or may take the form of the program control unit shown in FIGURE 7. If flip-flop 54–1 is initially at its set conduction state, then a positive-going pulse on conductor 55*a* is transferred through "and" circuit 58 to the set input conductor of flip-flop 54–2. On the other hand, if flip-flop 54–1 is initially in the reset conduction state, then a triggering pulse is generated on the reset input terminal of flip-flop 54–2 by the line 55*a* pulse. In this way, each pulse on conductor 55*a* acts to transfer the conduction state of each flip-flop into the next flip-flop, on the right, with the result that one digit will be stepped out from the final flip-flop 54–*n* for each pulse appearing on conductor 55*a***.

Figure 4:
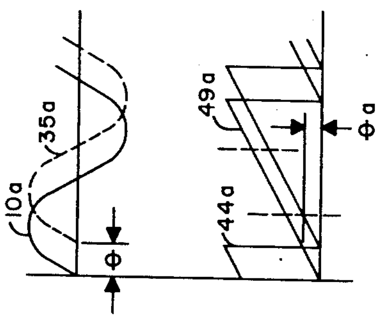
FIGURE 4 shows a pair of signal waveforms and binary number magnitudes for illustrating the manner of operation of the FIGURE 3 circuitry.

In FIGURE 4 is shown a pair of signal waveforms and counter magnitudes corresponding thereto for illustrating the operation of the FIGURE 3 circuitry. In particular, waveform **10*a* represents one cycle of the source 10 signal, while waveform 35*a* represents the resolver 35 signal as delayed by an amount, $\theta$, assumed for the purposes of example. The sawtooth waveforms 44*a* and 49*a* represent the binary counts within counters 44 and 49, respectively, plotted against time. Since the count within counter 49 is placed into register 52 at the instant counter 44 overflows, the portion of count 49*a*, designated $\theta a$, corresponds to the value placed into register 52**, since it is the value occurring at the overflow point.

The preceding description of operation is correct only so long as the resolver produced signal lags the input signal, with its corresponding count **44*a* being displaced to the right, as in FIGURE 4, from direct signal count 49*a*. If a leading phase shift were produced by resolver 35, then the output signal from the last flip-flop stage of counter 49 should be applied to the set terminal of flip-flop 58 instead of the last stage flip-flop within counter 44 and the count accumulated in register 52** would then represent by its magnitude, the amount of phase lead.

Generally speaking, the resolver should be coupled to shaft 38 such that, at one extreme position, there would be no initial phase shift produced in its output signal.

Then, with subsequent shaft movement, either an increasing or decreasing phase lag, as the case may be, would occur and be digitalized. No sign ambiguity problem in the readout value will exist if either procedure were followed.

Figure 5:
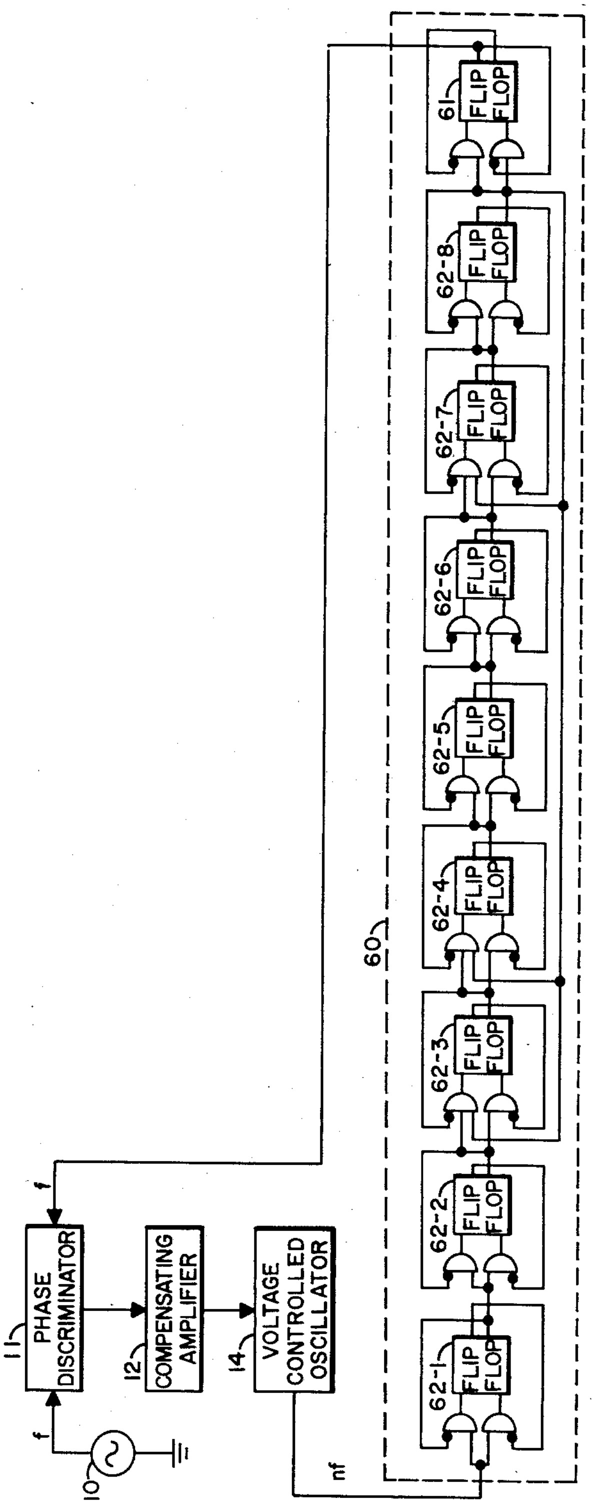
FIGURE 5 is a block diagram of a binary counter which may be employed in the circuit diagrams of FIGURES 1 and 3.

The preceding FIGURE 1 and FIGURE 3 embodiments disclosed binary counters which scaled their respective input frequencies down by a factor of $2^n$, an even binary power. In FIGURE 5, is shown a counter 60 arranged to divide the oscillator frequency down by other than a binary power, and for the purposes of example, produces a division of 360, hence enabling any phase in an incoming signal cycle to be detected to 1° in accuracy and resolution. It includes the usual phase discriminator 11, compensating amplifier 12, voltage-controlled oscillator 14, while counter 60 includes a total of eight flip-flops, numbered from 62–1 through 62–8 with a final flip-flop stage 61. The output signal from the reset terminal of flip-flop 62–8 is coupled to the set "and" circuit associated with the third flip-flop 62–3, the fourth flip-flop 62–4, and the seventh flip-flop 62–7. In all other respects, the flip-flop counter chain shown is similar to that described and shown earlier in FIGURES 1 and 3.

In the figure, flip-flops 62–1 through 62–8 are connected such that flip-flop 62–8 overflows once every 180 times. This is accomplished by having each flip-flop 62–8 overflow signal act to trigger each of flip-flops 62–3, 62–4 and 62–7 to its set condition rather than have it remain at its reset condition, as would be the overflow case in normal counters. Since eight serially-connected flip-flops would normally count to 256 before overflow, by reversing the input connections to the third, fourth and seventh flip-flops, their respective values of 4, 8 and 64, based on their respective positions in the counter, are effectively subtracted from the total 256 value, thereby leaving a final count value of 180. This means that flip-flop 62–8 will be triggered to undergo one complete cycle excursion for every 180 cycles in the signal from oscillator 14. Its cycle, however, will not be symmetrical, that is, its high and low voltage levels will not be of equal durations, and, in order to produce the desired square wave signal for feedback to discriminator 11, final flip-flop 61 is connected in normal binary counting fashion so as to be triggered by each positive-going signal in the flip-flop 62–8 waveform and hence produce equally lengthed increments of high and low signal values in its output signal, i.e., a square wave.

It will be appreciated that the FIGURE 5 counter embodiment may be employed in the FIGURE 1 or FIGURE 3 circuitry and that, instead of the specific 360 degrees of count down, any value may be used by merely employing the overflow signal for setting certain predetermined flip-flop stages, as illustrated and shown. In this embodiment, if the incoming signal frequency is termed $f$ and the count-down value of the counter is $x$, then voltage-controlled oscillator 14 must take on incoming signal of a frequency $f$ and produce a signal whose frequency is $xf$. Then, the output signal taken from flip-flop 61 will again be $f$.

Figure 6:
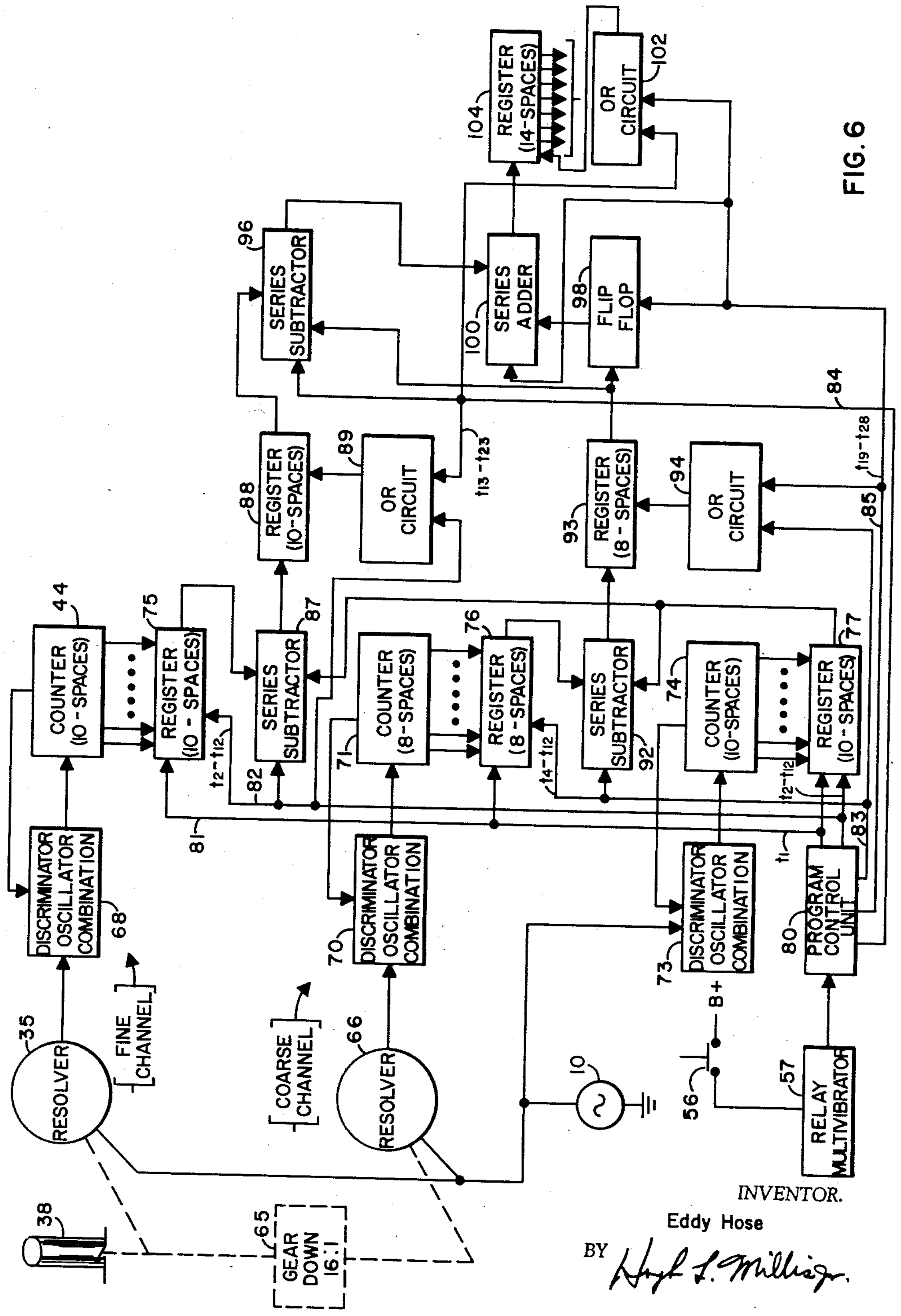
FIGURE 6 is a block diagram of another shaft-to-digital converter according to the present invention.

Referring now to FIGURE 6, there is illustrated an extension of the shaft position to digital conversion technique previously described in connection with the FIGURE 3 circuitry. Here, the output digital number representing the shaft displacement contains an increased number of significant digits without requiring, however, a comparable increase in the oscillator frequency and triggering frequency requirements of the first flip-flops in the counter chain. In particular, shaft 38 is again illustrated as being connected to resolver 35 and is also coupled through a 16:1 gear-reducer 65 to the shaft of another resolver 66. Resolver 35 and the circuitry associated therewith is termed the Fine channel, while the corresponding circuitry associated with the resolver 66 is termed the Coarse channel.

The Fine channel again includes a discriminator, compensating amplifier and voltage-controlled oscillator, previously designated by numerals 40, 41 and 42 in FIGURE 3, and herein shown combined as a discriminator-oscillator combination 68. The output signal from the oscillator of the combination is, as formerly, applied to binary flip-flop counter 44, here assumed to have 10 stages, with a feedback signal being taken from the last flip-flop stage therein for application to the phase discriminator within the combination. In the same way, the Coarse channel includes a discriminator-oscillator combination 70 whose output signal is applied to an 8-stage binary flip-flop counter 71, in turn having a feedback connection being taken back to combination 70.

The reference channel includes another discriminator combination 73, similar to the previous ones, whose output signal is applied to a 10-stage binary counter 74, again with the appropriate feedback connection. The reference channel is fed directly from the source 10 output signal, while the source 10 signal is applied across resolvers 35 and 66 in the Fine and Coarse channels, respectively.

Registers 75, 76 and 77 are associated with counters 44, 71 and 74, respectively, and each is assumed identical in form to the previously described register 52 in FIGURE 3. Each register, accordingly, has both transfer and stepping conductors. The transfer conductor of each register, when energized, acts to transfer in parallel the contents of its associated register, such as registers 44, 71 or 75, into it, and hence the transfer conductor corresponds to the amplifier 59 output conductor in FIGURE 3. Pulses applied to the series transfer conductor, corresponding to line 55 in FIGURE 3, act to serially step the digits down and out of the register.

A program control system 80 controls the operation of the system and is illustrated in more detail in the following FIGURE 7. Its input signal is derived from delay multivibrator 57, again energized, as in FIGURE 3, by a push-button 56, connected between its input terminal and a source of B+ potential.

Program control unit 80 includes a series of output conductors and produces various numbers of pulses on the different output conductors during each cycle of its operation, as initiated by a depression of push-button 56. In particular, an output line 81 is connected to the transfer input terminals or conductors of registers 75, 76 and 77, the $t_1$ symbol associated therewith signifies that a pulse appears on the conductor during only the first interval, $t_1$, of each cycle.

Another output conductor 82 from unit 80 is connected to the stepping terminals of registers 75 and 77, and produces 12 consecutive pulses during the $t_2$ through $t_{12}$ intervals of each program control unit 80 cycle. An output conductor 83, connected to the stepping input terminal of register 76 furnishes pulses from intervals $t_4$ through $t_{12}$ of each cycle. The output flip-flop stages, not specifically illustrated, of registers 75 and 77 are connected to the two respective inputs of a series subtractor 87 whose output signals, in turn, are applied to the input of another 10-stage register 88.

Conductor 82 is also coupled to the stepping terminal of series subtractor 87 and also to one input terminal of an "or" gating circuit 89. The other input terminal of "or" circuit 89 is connected to another output connector 84, from control unit 80, which provides pulses during the $t_{13}$ through $t_{23}$ intervals of each unit 80 cycle of operation. "Or" circuit 89, in turn, has its output terminal connected to the stepping conductor of register 88.

The final flip-flop stage, not illustrated, of register 76 is coupled to one input of another series subtractor 92, while the final flip-flop of reference channel register 77 is connected to the other input of subtractor 92. Subtractor 92 is coupled to the input of another register 93 and the previously noted output conductor 83, providing pulses during the $t_4$ through $t_{12}$ intervals, is also coupled to the stepping terminal of series subtractor 92 and to one input terminal of an "or" circuit 94. The output terminal of circuit 94 is coupled to the stepping conductor terminal of register 93. Another output conductor 85 from program control unit 80 provides pulses appearing during the $t_{19}$ through $t_{28}$ intervals of each cycle and is connected to the other input terminal of "or" circuit 94.

The final flip-flop stages, not shown, of registers 88 and 93 are connected to the two respective inputs of another series subtractor 96, whose output is applied to one input of a series adder 100. The output flip-flop, not shown, of register 93 is coupled to a flip-flop 98, which, in turn, is coupled to the other input of series adder 100. Series subtractor 96 receives the $t_{13}$ through $t_{23}$ interval signals appearing on line 84, while flip-flop 98 and series adder 100 receives the stepping signal appearing on conductor 85. Lines 84 and 85 are also connected to the two respective input terminals of an "or" circuit 102, whose output signal is applied to the stepping conductor of a final stepping register 104. The output of series adder 100 is applied to the input of register 104.

The primary function of the FIGURE 6 circuitry is to provide a shaft position to digital number conversion providing considerably more significant binary digits, representing greater accuracy and resolution, than may be readily accomplished by the FIGURE 3 technique. Consider for the moment the basic problem involved in employing the FIGURE 3 circuitry for deriving, by way of example only, a binary number conversion of 14 significant place digits. If the signal source frequency applied across the resolver were, say, 1000 cycles per second, then the frequency multiplication required by the oscillator would be $2^{14}$, or approximately 16,000 times. This, in turn, would yield an oscillator frequency, and hence a first flip-flop stage counting rate, of 16 megacycles, a relatively difficult figure to attain electronically. For comparison purposes, the FIGURE 6 circuitry is capable of performing the same conversion, that is, to 14 significant digits, and yet requires only a maximum frequency multiplication of $2^{10}$, or approximately 1000 times. Hence, a source 10 signal frequency of 1000 cycles would require a modest 1-mc. counting rate for the first flip-flop stage.

Considering now the detailed operation of the FIGURE 6 circuitry, shaft 38 is geared down by a factor of $2^4$, or 16 times, by gear box 65 and hence coarse channel resolver 66 makes one complete revolution for each 16 corresponding revolutions made by the fine channel resolver 35. This means, then, that shaft 38 may undergo a total of 16 revolutions before the shaft of resolver 66 begins to repeat its earlier positions, at which time the system reading would be ambiguous. The signal from source 10 is delayed by resolver 35 an amount corresponding to the shaft 38 position, and, in the manner earlier described, the counter 44 count magnitude at any instant represents the phase interval after the last positive-going zero cross-over point in the resolver 35 output signal. In the same way, the magnitudes of the counts contained within counters 71 and 74 represent at all times the phase angle following the last zero cross-over of the resolver 66 output signal and the source 10 reference signal, respectively.

A readout operation cycle in which the shaft 38 position is converted into a binary number is initiated by depressing push-button 56. It will be recognized, of course, that this manually operable push-button is shown only for the purpose of example, and in many embodiments it would be replaced by a computer produced signal, indicating, for example, that the computer was ready to receive another binary number readout for computational purposes. Depression of the push-button actuates delay multivibrator 57, and this actuation in turn, initiates one cycle of operation of program control unit 80, whose detailed circuit arrangement is shown in FIGURE 7 and described in connection therewith.

The first time interval of the cycle is occasioned by a single pulse, $t_1$, appearing on line 81, which acts to transfer in parallel the count in the three counters into their respective registers. The next step in the conversion cycle is to effectively subtract the reference channel number from both of the Fine and Coarse channel register numbers in order to get Fine and Coarse channel numbers which represent their actual resolver shaft positions. This is acocmplished by having the $t_2$ through $t_{12}$ pulses, produced on output conductor 82 and occurring during the next following eleven consecutive time intervals, act to serially step the contents of registers 75 and 77 through series subtractor 87 into Fine channel register 88.

Since register 76 is only eight binary spaces in length, which, in turn, corresponds to the eight most significant digits of the register 77 count, the subtraction of the register 77 count from the register 76 count by subtractor 92 is withheld during passage of the two least significant digits, the $t_2$ and $t_3$ intervals, out of register 77. Accordingly, the subtraction between the numbers in registers 76 and 77 is made during the $t_4$ through $t_{12}$ clock intervals, in accordance with the $t_4$–$t_{12}$ pulses appearing on line 83, and the subtraction results are, accordingly, passed into Coarse channel register 93.

Series subtractors 87 and 92 may take any one of a large number of different forms, as will be appreciated by those skilled in the art. For example, in the book entitled "Arithmetic Operations in Digital Computers" by R. K. Richards, published in 1955 by the D. Van Nostrand Company, Inc., New York, New York, there is given a discussion of several adders and subtractors, their logic, etc., on pages 128–135, which also contain references to other sections of the book for additional details. In this FIGURE 6, it is assumed that each subtractor includes three flip-flops, two of which merely hold the successive digits stepped into the subtractor from its two associated registers. The third flip-flop is employed for holding the carry results from each successive series subtraction. The results of each subtraction is fed, in the form of triggering signals, into the first flip-flop in register 88 from subtractor 87 and the first flip-flop in register 93 from subtractor 92. Then, the successive digits of each subtraction are stepped down the respective registers 88 and 93 during successive clock times, since timing signals are applied to the stepping conductors of the two registers by "or" circuits 89 and 94.

At the end of the $t_{12}$ interval, the binary number contained in register 88 will represent the 10 least significant digits of the shaft 38 position conversion. Now, since shaft 38 was geared down 16 or $2^4$ times, corresponding to four binary digits, and has been converted in a binary number of 8 digits long, it is apparent that only the four most significant digits in register 93 will represent additional information over that contained in register 88, while the four least significant digits of the conversion will represent redundant information. The overlapping digits, as will soon be explained, enable any backlash existing in the gearing between the two channel resolvers to be corrected when the two members are combined to form a single number representing the conversion.

Before proceeding to the description of operation of the remaining portion of the FIGURE 6 circuitry, an explanation of the basic techniques employed in combining the Coarse and Fine channel numbers will be given. First of all, by way of example, consider a pair of numbers having both fewer significant digits and less overlap than those contained by the registers in the figure. For example, consider both Fine and Coarse channel numbers to be of four significant digits in length, the two least significant digits of the Coarse channel number overlapping the two most significant digits of the Fine channel. If now, there were no backlash in the gearing system, that is, if the shafts of resolvers 35 and 66 were driven at a precise gear-down relationship with each other, then the overlapping digits would always correspond. As an example:

| | |
|---|---|
| Fine channel | 0110 |
| Coarse channel | 1001 |

The number representing the conversion is readily observed as 100110, where the two most significant digits are obtained from the Coarse channel reading, and the remaining digits from the Fine channel.

Now the effects of gearing backlash may be seen by observing the two number magnitudes. In particular, assume that, owing to backlash, the resolver 66 shaft lags slightly from the previously assumed precise relationship with the resolver 35 shaft such that its count is less by one digit, considered from its least significant digit. Again, by way of example, if the Fine channel number were 0000, then the Coarse channel number would be 1111, as below:

| | |
|---|---|
| Fine channel | 0000 |
| Coarse channel | 1111 |

In this case, the true conversion number is 000000, although the Coarse reading is off owing to the assumed backlash. Hence, a simple combination of the two numbers will not yield the correct conversion number.

Continuing the example, the Coarse channel may lead the Fine channel reading by one digit, owing to an opposite direction of backlash and the following set of readings would thereby be obtained:

| | |
|---|---|
| Fine channel | 0000 |
| Coarse channel | 0001 |

There remains one other possible value difference between the redundant digits and, continuing the previous example, it is:

| | |
|---|---|
| Fine channel | 0000 |
| Coarse channel | --10 |

As may be readily understood, the Coarse channel reading may actually be two digit values high, 0010, or, on the other hand, may be two digit values low, or 1110. This distinction is important since a series-type, rather than parallel, of correction is to be made and only the overlapping or redundant digits will be seen together, digit by digit, and hence the most significant digits of the Coarse reading will not be available for correction until after complete passage of the Fine channel and redundant digits. By definition, then, when the last example occurs, the Coarse channel is deemed to be two values higher, rather than lower, and the specific types of series correction technique employed, to be subsequently described in detail, acts to correct the Coarse channel reading based on this assumption.

The above example contained two overlapping digits which will, as will be understood, accommodate a predetermined amount of backlash. In fact, because of assumptions which must be made for accommodating the two unit value differences, less negative backlash can be tolerated than positive backlash. In the event of a more severe backlash problem, a greater number of overlapping digits must be used, and the same corrective technique can then again be employed. Below is given a table setting forth different numbers of overlapping digits. In the table, the most significant digit of the overlapping region is assigned a value of ½.

*Table I*

| | 2-Stage Overlap | 3-Stage Overlap | 4-Stage Overlap | 5-Stage Overlap |
|---|---|---|---|---|
| Negative Limit | $-1/4$ | $-3/8$ | $-7/16$ | $-15/32$ |
| Positive Limit | $+1/2$ | $+4/8$ | $+8/16$ | $+16/32$ |
| Difference between Negative and Positive Limits | $1/4$ | $1/8$ | $1/16$ | $1/32$ |

It will be observed from the table, that as the number of overlapping digits is increased, the difference between the assumed degree of allowable negative and positive backlash becomes smaller and equals $1/2^n$, where $n$ equals the number of overlapping stages.

Before proceeding with the description of operation of the remaining FIGURE 6 circuitry, the mathematical processes employed to combine the Fine and Coarse channel readings to yield a single conversion number will be described. Briefly, with the Fine and Coarse channel number digits serially positioned according to their relative values, the Coarse channel number is subtracted from the Fine channel number and the results of the subtraction added back to the Coarse channel number. The result, as will be shortly seen, constitutes the corrected binary number representing the shaft position. In effect, what is done is, during the interval of the Fine channel number appearance prior to the overlapping region, the subtraction and addition restores the Fine channel reading, since the Coarse channel is assumed to have all 0's during this interval. This subtraction operation will, for the overlapping portion, yield a number corresponding to the difference between the Fine and Coarse channel values, and its addition back to the Coarse channel number will also act to restore exactly the Fine channel digits. However, the subtraction and addition operation will, at the end of the passage of the overlapping digits, and if the backlash condition so warrants, result in a carry which, in being effectively added to the remaining digits of the Coarse channel causes them to be corrected for their initial offset due to backlash. This effective carry arises by treating, as 0, all Fine channel digit places following the overlapping portion.

Consider, as an example, the previous case:

| | | |
|---|---|---|
| (1) | Fine | 0000 |
| (2) | Coarse | 1111 |
| (3) | Subtract (2) from (1) | 000100 |
| (4) | Add (3) to (2) | 000000 |

where line (4) gives the corrected readout value.

As another example,

| | | |
|---|---|---|
| (1) | Fine | 0000 |
| (2) | Coarse | 0010 |
| (3) | Sub. (2) from (1) | 111000 |
| (4) | Add (3) to (2) | 000000 |

where (4) again gives the corrected readout value based on the Table I assumptions.

Having established the correction requirements and general mathematical method of achieving the correction, the operation of the remaining portion of the FIGURE 6 circuitry may now be described. It may be noted that since four digits are overlapped in the figure, the backlash limits given in column 4 of Table I are applicable. The first six significant digits of the register 88 number are stepped through series subtractor 96 by the pulses appearing on line 84 during the $t_{13}$ through $t_{18}$ time intervals. Since the contents of register 93 will not, during these time intervals, be stepped into the subtractor, the Coarse channel digits will be treated as zero, and the register 88 digits will pass through the subtractor without change. After passage through the subtractor, they will also be unaltered in traveling serially through series adder 100 into output register 104, since, during this time also, the Coarse channel digits will not be stepped, and hence treated as zeros by the adder. It may be noted that, at the end of the $t_{18}$ interval, the last two of the Fine channel digits will be contained in subtractor 96 and adder 100, but will, during the next two time intervals, be stepped without change, into register 104, since the other flip-flop within the adder and subtractor will be and remain zero for these two intervals.

Now, beginning with the $t_{19}$ interval, where the overlap region begins, the contents of the Coarse channel register 93 will be stepped through series subtractor 96 in conjunction with coincident stepping of the remaining register 88 digits. These Coarse channel digits will be subtracted, through the $t_{23}$ interval, from the corresponding four most significant Fine channel digits, with the results of the subtraction being stepped into series adder 100. Simultaneously with the subtraction, the Coarse channel digits are delayed by flip-flop 98 so that they will correspond, timewise, with the digits resulting from the subtractor 96 digits. These digits are then added by series adder 100 to the digits resulting from the subtraction operation and the results of the addition passed serially into register 104.

The most significant digit of the Fine channel will be followed by zero values after the end of the $t_{23}$ interval. Accordingly, the four most significant digits of the Coarse channel register 93, as they step through subtractor 96 during the $t_{23}$ through $t_{26}$ interval, will be subtracted from corresponding zero value digits coming from register 88, and the results of the subtraction will, during the same time intervals, be added in series adder 100 with the corresponding Coarse channel digits passing through delay flip-flop 98. Since flip-flop 98, series adder 100 and register 104 are energized through the $t_{28}$ intervals, the stepping will continue until flip-flop 98 and adder 100 are completely emptied into register 104.

Following this, the contents of register 104 may be transferred in parallel or in series to a computer, for additional computation purposes, or into a recorder or any digital utilization device as may be required.

Figure 7:
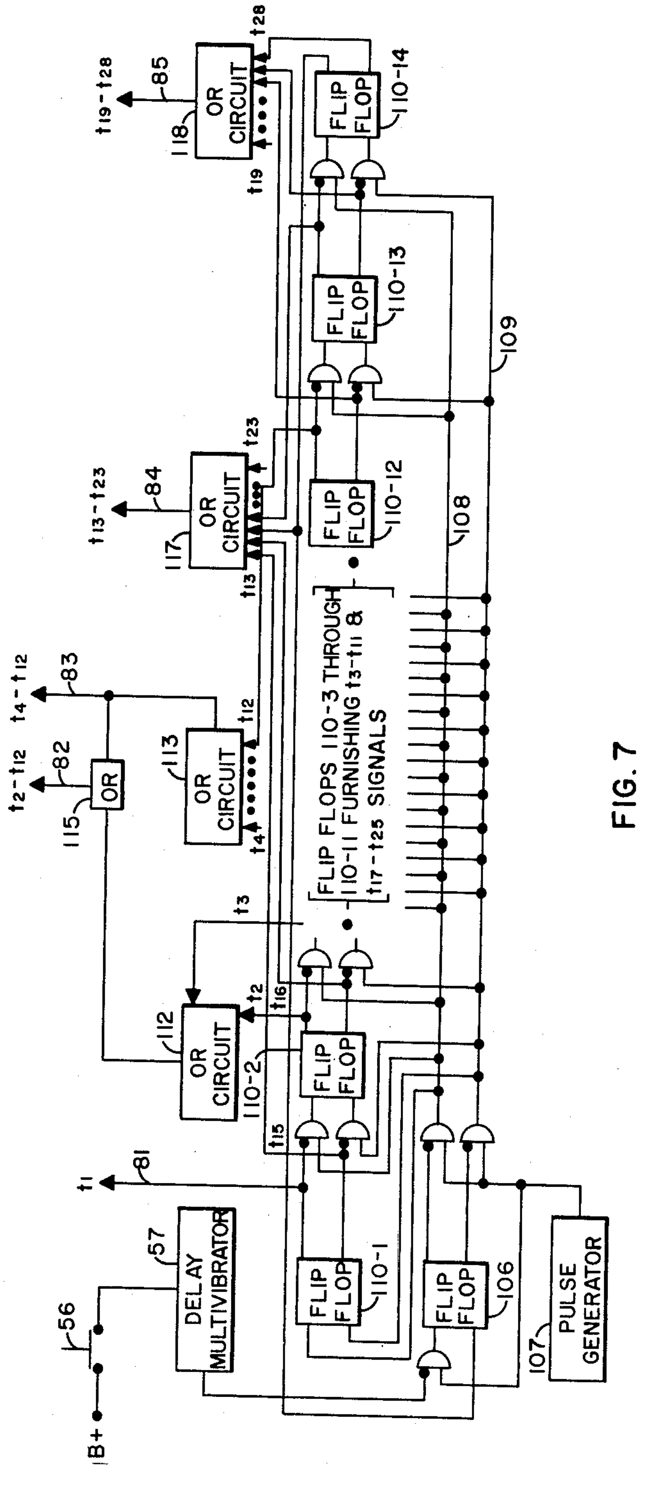
FIGURE 7 is a block diagram of the program control unit of FIGURE 6.

Program control unit 80, previously shown in block diagrammatic form in FIGURE 6, is illustrated in detail in FIGURE 7. Again shown is push-button 56 and delay multivibrator 57, whose output signal is applied, within unit 80, to one input terminal of an "and" gating circuit, whose output terminal, in turn, is connected to the set input terminal of a flip-flop 106. The set and reset output terminals of flip-flop 106 are connected to one input terminal of each of a pair of "and" gating circuits, whose output terminals, in turn, are connected to a first common clock line 108 and a second common clock line 109, respectively. The output terminal of a pulse generator 107 is connected to the other input terminal of each of the "and" gating circuits associated with common lines 108 and 109, and also to the other input terminal of the "and" circuit associated with the set input terminal of flip-flop 106.

A flip-flop chain, comprising 14 serially connected flip-flops, is included in the programming unit, and flip-flops 110–1 and 110–2 representing the first two flip-flops of the chain are shown as are the final flip-flops designated 110–12, 110–13 and 110–14. The set and reset input terminals of the first flip-flop 110–1 are connected directly to clock lines 108 and 109, respectively. The connections between each pair of serially associated flip-flops in the chain are identical, and, by way of example, the set output terminal of flip-flop 110–1 is coupled to one input terminal of an "and" gating circuit, whose output terminal is connected directly to the set input terminal of flip-flop 110–2. The other input terminal of the set "and" gate is connected to clock line 108, while the reset output terminal of flip-flop 110–1 is connected through an "and" circuit to the reset input terminal of flip-flop 110–2, with the other terminal of the reset "and" circuit being connected to clock line 109. The connections thus described between the first two flip-flops of the chain are identically repeated between the output terminals of each flip-flop and the input terminals of the next following flip-flop.

The set output terminals of flip-flops 110–1 through 110–14 are given time interval designations $t_1$ through $t_{14}$, respectively. In the same way, the reset terminals of the same series of flip-flops are given respectively $t_{15}$ through $t_{28}$ time interval designations. The output conductor 81 of the program control unit, yielding the $t_1$ clock pulse, is connected directly to the set output terminal of flip-flop 110–1. The $t_2$ and $t_3$ conductors are connected to the two input terminals of a two-terminal "or" circuit 112, whose output signal, in turn, is applied to one input terminal of another two-terminal "or" circuit 115. The $t_4$ through $t_{12}$ flip-flop signals are applied to a nine input terminal "or" circuit 113, whose output terminal, in turn, is coupled to the other input terminal of "or" circuit 115. The output conductor of "or" circuit 113 constitutes output line 83, on which the $t_4$ through $t_{12}$ clock interval pulses appear. The output terminal of "or" circuit constitutes output conductor 82 and carries the $t_2$ through $t_{12}$ interval output pulses. The $t_{13}$ through $t_{23}$ signals are taken from their corresponding flip-flop conductors and applied to an eleven-terminal "or" circuit 117, whose output terminal constitutes conductor 84 bearing the $t_{13}$ to $t_{23}$ pulses. Finally, the $t_{19}$ through $t_{28}$ signals are applied to the input terminals of the ten-terminal "or" circuit 118, whose output terminal constitutes conductor 85 and carries the $t_{19}$ through $t_{28}$ pulses.

In considering its detailed manner of operation, assume initially that all of the 110 series of flip-flops are at their zero or reset condition, and that flip-flop 106 is also in its reset conduction state condition. As long as this series of conduction states exists, the triggering pulses from generator 107 will apear on line 109 and from there be applied through each of the "enabled" reset input "and" gating circuits to the reset input terminal of each flip-flop in the chain, with the result that no flip-flop triggerings will take place. Upon depression of push-button 56, however, and the subsequent actuation of delay multivibrator 57, the set input "and" gate terminal of flip-flop 106 will be enabled, and the next pulse appearing from pulse generator 107 will trigger flip-flop 106 to its set conduction state. When this has occurred, the "and" gate on pulse line 108 will be opened and the pulses from generator 107 will appear on line 108 and will, at the same time, be inhibited from further appearance on line 109.

The first pulse appearing on line 108, after reversal of the flip-flop 106 conduction state, will act to reverse the reset state of flip-flop 110–1 to its set condition. All other pulses applied to the various "and" circuits from line 109 will produce no triggering action, owing to the prevailing reset conditions of all of the flip-flops and consequent inhibition of the "and" circuits associated with the set input terminals. The signal appearing on the set output terminal of flip-flop 110–1 will go from a relatively low to high voltage level as the conduction state of the flip-flop is reversed and the positive-going signal, preferably in pulse form, constitutes the $t_1$ time interval signal appearing on conductor 81.

With flip-flop 110–1 high, the next pulse, $t_2$, appearing on line 108, will be passed by the enabled "and" gating circuit associated with the set input terminal of flip-flop 102, with the result that the state of flip-flop 102 will be reversed, hence producing a positive-going $t_2$ pulse. In the same way, successive pulses appearing on the 108 line will cause successive flip-flops in the chain serially actuated with corresponding output pulse signals being successively produced during the $t_3$ on through the $t_{14}$ intervals, the latter representing the actuation of flip-flop 110–14. This last pulse, in being coupled back to the reset input terminal of flip-flop 106, will cause a reversal of its conduction state with the result that the generator 107 pulses will be transferred to line 109 and be inhibited from line 108.

Now, the first pulse appearing on line 109 will reverse the conduction state of flip-flop 110–1 from its set to reset condition and a positive-going signal will accordingly be produced on the $t_{15}$ output conductor, taken from the reset output terminal of flip-flop 110–1, for application to "or" circuit 117. Then, following pulses on line 109 will act to reverse, in sequence, the set conduction states of the series of flip-flops to their reset states, with corresponding pulses being successively produced during the $t_{16}$ on through the $t_{28}$ time intervals on the respectively correspondingly numbered conductors. The final, $t_{28}$, pulse will come from the reversal of the final flip-flop 110–14 from its set to reset condition. When this condition is reached, no additional circuit operation will take place, as the originally assumed condition will be in effect, as explained previously. The cycle is thus ended and nothing further will occur until push-button 56 is again depressed to, in turn, cause the triggering of flip-flop 106 to its set condition again.

"Or" circuit 112 will pass the $t_2$ and $t_3$ pulses, while "or" circuit 113 will act to pass the $t_4$ through $t_{12}$ pulses. Since "or" circuit 115 takes both sets of these "or" circuit pulses, output line 82 will contain pulses during the $t_2$ through $t_{12}$ intervals. In the same way, the remaining "or" circuits 117 and 118 will pass pulses corresponding to the pulses appearing on their input terminals during the designated time intervals.

It will be appreciated, in concluding this description, that the principles outlined in the FIGURE 6 and FIGURE 7 detailed embodiment can be readily broadened to include more than just the two channels shown. For example, in extending the embodiment, additional resolvers would be driven at successively reduced speeds from the resolver 66 shaft, in the same manner that resolver 66 was driven from shaft 38. Then, a binary number would be created for each added channel resolver, similar to those obtained in registers 75 and 76, and, by employing additional series subtractors such as at 87 and 92, additional binary numbers representing the respective resolver displacements would be obtained. Finally, a single number representing the total displacement of the input shaft would be obtained by successively combining the binary numbers of adjacent channels, beginning with the two lowest geared resolver channels, in the manner shown in FIGURE 6 for the two channels therein illustrated.

The general technique shown and described in FIGURES 6 and 7 has a more general application than the specific embodiment shown. For example, assume that a shaft's position is desired in binary number form and further, that binary coded discs with suitable digit sensing and output registers are to be employed for providing the conversion. Further assume that the number of significant digits required by the conversion exceeds the digit capacity of a given disc. This requirement may be met, in accordance with the present invention, by directly coupling a first disc to the shaft, and then driving the second disc from the first disc through a step-down gear arrangement, the degree of gear-down being such as to provide overlapping readout digits within at least the backlash limits of the gear drive mechanism. This portion of the technique is similar to that employed for the pair of resolvers in FIGURE 6. Then, after readout, the two binary number readings obtained from the pair of discs would be combined in accordance with that portion of the FIGURE 6 technique which employs subtractor 96, adder 100, register 104, etc.

With this accomplished, the resulting number will precisely correspond to the shaft position, and will include more significant digits than could normally be obtained from a single disc, as described. Hence, this general technique enables a binary number conversion to be obtained of a shaft position to an increased number of significant digits than would be possible by employing a single phase-to-digital converter, a single binary coded disc, and yet not require precise gearing between the resolvers or discs, as the case may be. It will also be appreciated that this general technique may also be applied to other types of conversion devices than the specific phase-to-digital as shown, and the binary coded disc as described.

It will be appreciated, of course, that if shaft 38 is limited in its angular movement to one complete revolution or less, the FIGURES 6 and 7 technique need not be employed and the FIGURE 3 embodiment would be appropriate.

It will also be apparent to those skilled in the art that the various embodiments shown of the present invention may be modified in numerous particulars including the type and arrangement of circuits as shown, and the various stated functions still be accomplished without involving invention. It is also apparent that each of the circuits, as shown in block diagrammatic form, may take any one of many recognized forms known in the art, and described in numerous reference and technical books, magazines, etc., without the employment of invention.

It will be further appreciated, of course, by those skilled in the art, that the foregoing disclosure relates only to a few preferred embodiments of the invention whose spirit and scope are set forth in the appended claims.

What is claimed is:

1. An electronic detector for indicating a predetermined phase point in each cycle of an input periodically varying signal, said detector comprising: means for continuously producing a binary number whose value at any instant represents the phase angle of said input signal after the previous zero cross-over point in its cycle; and indicating means responsive to the binary number count produced by the first-named means whose magnitude corresponds to said predetermined phase point in each cycle of said input signal for producing an output indication.

2. The electronic detector according to claim 1 wherein said first-named means includes binary counting means responsive to an applied signal for reducing the frequency thereof a predetermined number of times in forming an output signal, phase-to-frequency converter means responsive to a pair of applied signals for producing an output signal whose frequency corresponds to the phase difference between said applied signals; means for applying the output signal of said binary counting means and said input signal to said phase-to-frequency converter, means for applying the output signal produced by said phase-to-frequency converter to said binary counting means whereby the phase difference between the output signal of said binary counting means and said input signal are maintained constant and the count at any instant in said binary counting means represents the phase angle of the input signal measured during its then existing cycle.

3. The electronic detector according to claim 2 wherein said binary counting means includes a series of binary counting stages and said indicating means includes an "and" gating circuit, said gating circuit including a series of input terminals connected to the series of binary counting stages in said binary counting means.

4. An electronic device for producing an output signal having a predetermined phase relationship with an input signal, said device comprising: frequency divider means responsive to an applied signal for producing an output signal whose frequency is a predetermined fraction of the frequency of said applied signal; oscillator means responsive to an applied signal for producing an output signal whose frequency is related to the value of said applied signal; phase difference determining means responsive to the phase difference between said input signal and the output signal produced by said frequency divider means for producing an output signal; and means for applying the output signal produced by said phase difference detecting means to said oscillator means whereby the output signal produced by said frequency divider means is phase-locked with said input signal.

5. An electronic device for producing an output signal having a predetermined phase relationship with an input first signal of a first frequency, said device comprising: signal producing means for producing a second signal normally of a second frequency value but responsive to an applied signal for varying said second frequency value in accordance with the value of said applied signal; frequency scaling means responsive to an applied signal for producing an output signal of a third frequency, said third frequency being scaled down from the frequency of the applied signal an amount corresponding to the ratio between said second and said first signal frequencies; means for applying said second signal to said frequency scaling means whereby the frequency of said output signal corresponds to said first signal frequency; phase comparison means responsive to a difference in phase between a pair of applied signals for producing a signal whose magnitude corresponds thereto; means for applying said first and said output signals to said phase comparison means; means for applying the signal produced by said phase comparison means to said signal producing means whereby the normal second frequency value of said second signal is varied to maintain a predetermined phase relationship between said first and said output signals.

6. The electronic device according to claim 5 wherein said frequency scaling means includes a binary number counting means responsive to said second signal for counting down said second signal to produce said output signal, the value of the number in said binary number counting means representing, at any instant, the phase of said first signal during its then existing cycle, and including, in addition, first means responsive to each appearance of a predetermined count in said binary number counting means for producing an output signal.

7. The electronic device according to claim 6 including, in addition, an electronic switching device including first and second input terminals and responsive to signals applied to said first and second input terminals for switching into first and second conduction states, respectively; means for applying the output signal produced by said first means to said first input terminal; second means connected to said binary counter and responsive to a second predetermined count in said binary number counting means for producing an output signal; and means for applying the output signal produced by said second means to said second input terminal whereby said electronic switching device is switched between its first and second conduction states in accordance with said first and second predetermined counts in said binary counting means and a predetermined portion in each cycle of said input signal is thereby indicated.

8. An electronic device for producing a varying binary number whose magnitude continuously represents the phase of an input periodically varying signal measured after its last zero value cross-over point, said device comprising: means responsive to an input D.-C. signal for producing an output A.-C. signal whose frequency corresponds to the magnitude of the input D.-C. signal; binary counting means for continuously counting the cycles of the A.-C. signal produced by the last-named means and producing an output signal whose frequency corresponds to the frequency of said input periodically varying signal; discriminator means responsive to the phase difference between a pair of applied signals for producing an output D.-C. signal whose magnitude corresponds to the phase difference between the pair of applied signals; and means for coupling said input periodically varying signal and the output signal produced by said binary counting means to said discriminator means whereby the A.-C. signal produced by said last-named means is continuously modified in frequency so that the pair of signals applied to the discriminator means have a predetermined phase relationship with each other and the count in said binary counting means represents, at any instant, the phase of the input periodically varying signal measured after its last zero value cross-over point.

9. An electronic device for converting the phase difference between first and second periodically varying signals into a binary number, said device comprising: first and second means responsive to said first and second signals for producing continually varying first and second binary number counts whose instantaneous magnitudes represent the then existing phase angles of said first and second signals as measured during their respective cycles; and means for deriving a binary number representing the difference in magnitude of the binary number counts produced by said first and second means, said derived binary number representing the phase difference between said first and second signals.

10. The electronic device according to claim 9, wherein each of said first and second means includes binary counting means responsive to an applied signal for counting down said applied signal to produce an output signal whose frequency is a predetermined fraction of the frequency of the applied signal, oscillator means responsive to an applied signal for producing an output signal whose frequency is related to the value of said applied signal, signal phase difference means responsive to the phase difference between a pair of applied signals for producing an output signal, said electronic device also including means for applying the output signals produced by the binary counting means in said first and second means and the first and second periodically varying signals to the signal phase difference means in said first and second means, respectively, and means for applying the output signals produced by the signal phase difference means in said first and second means to said oscillator means in said first and second means, respectively, whereby the output signals produced by the binary counting means in said first and second means are phase-locked with said first and second input periodically varying signals, respectively, and the instantaneous magnitudes of the binary number counts in said first and second means represent the then existing phase angles in said first and second input periodically varying signals, respectively.

11. An electronic device for converting the phase difference between first and second signals into a binary number, said device comprising: first and second signal producing means, the output signal frequency of each of said signal producing means being a function of an impressed input signal potential; first and second binary counting means, each of said counting means being responsive to an applied signal for reducing the frequency thereof a predetermined number of times; first and second phase comparison means, each of said phase comparison means being responsive to the phase difference between a pair of input signals for producing an output signal potential; means for applying said first signal and the output signal of said first counter and said second signal and the output signal of said second counter to said first and second phase comparison means, respectively whereby the output signal potentials of said first and second phase comparison means represent the phase differences between their respective pairs of applied input signals; means for applying the output signal potentials of said first and second phase comparison means to said first and second signal producing means, respectively; means for applying the output signals produced by said first and second signal producing means to said first and second binary counters, respectively, whereby the counts in said first and second binary counters at any given instant represent the phase angles of said first and second signals after their last zero signal cross-over points, respectively; and means for deriving a count representing the difference in the counts in said first and said second counters, the resulting count representing the phase difference between said first and second signals.

12. The electronic device according to claim 11, wherein each of said binary counting means includes an identical number of serially connected binary stages, and including, in addition, binary register means including said number of binary stages, one for each of the binary stages in either of said first or second binary counting means, and means responsive to a zero magnitude count in one of said binary number counting means for transferring the count in each of the stages of the other of said binary counting means into its corresponding stage in said binary register means.

13. An electronic device for converting the position of a shaft into a digital number, said device comprising: first means for producing a periodically varying signal; second means for shifting the phase of said periodically varying signal an amount corresponding to the position of said shaft; first and second signal responsive means responsive to the signal produced by said first means and the phase-shifted signal produced by said second means, respectively, for producing first and second continuously varying binary number counts, respectively, whose instantaneous magnitudes represent the then existing phase angles of the output signals of said first and second means, respectively; and means for deriving a binary number representing the difference in magnitude of the binary number counts of said first and second signal responsive means, said derived binary number representing the phase difference between said periodically varying and said phase shifted periodically varying signals and hence the position of said shaft.

14. The electronic device according to claim 13 wherein each of said first and second signal responsive means includes binary counting means responsive to an applied signal for reducing the frequency thereof a predetermined number of times in forming an output signal, phase-to-frequency converter means responsive to the difference in phase between a pair of applied signals for producing an output signal whose frequency is related to the phase difference between the applied signal; means for applying the output signal of said binary counting means to said phase-to-frequency converter means; means for applying the output signal produced by said phase-to-frequency converter to said binary counting means, and means for applying the output signals of said first and second means to said phase-to-frequency means in said first and second signal responsive means, respectively, whereby the phase difference between the output signal of said binary counting means in said first and second signal responsive means and the output signal of said first and second means, respectively, are maintained constant and the counts at any instant in the binary counting means in said first and second signal responsive means represent the phase angles of the output signals of said first and second means, respectively, measured during each of their then existing cycles.

15. An analog-to-digital converter system for producing a binary number whose value represents the angular position of a multi-turn first shaft, said multi-turn shaft being geared down to drive a second shaft, said system comprising: a signal source producing an output reference signal; first and second means for phase shifting said reference signal an amount corresponding to the position of said first and said second shafts, respectively; first and second signal responsive means responsive to the signals phase shifted by said first and second means for producing first and second binary numbers, respectively, each of whose values correspond to the amount of phase shift of its associated signal; and means for combining the first and second binary numbers produced by said first and second signal responsive means, respectively, to form a single binary number whose magnitude represents the angular position of said multi-turn first shaft.

16. A conversion system for producing a binary number whose value represents the total angular displacement made by a multi-turn first shaft, said multi-turn shaft being geared down to drive a second shaft, said system comprising: first means producing an output reference signal; second and third means for phase shifting said reference signal an amount corresponding to the angular positions of said first and second shafts, respectively; first, second and third signal responsive means responsive to the signals produced by said first, second and third means for producing continuously varying first, second and third binary members, respectively, each of whose instantaneous magnitudes represent the phase angle of its associated input signal; first and second binary number subtraction means for producing fourth and fifth binary numbers representing the instantaneous difference in values between said first and said second and said first and said third binary numbers, respectively, whereby said resulting fourth and fifth binary numbers represent the phase displacements of said first and said second shafts, respectively; and means for combining said fourth and fifth binary numbers to form a sixth binary number whose value represents the total angular displacement made by said multi-turn first shaft.

17. An electronic device for deriving a binary number representing the total displacement of a multi-turn input shaft, said input shaft being geared down by a gearing mechanism having a predetermined gearing ratio to drive a second shaft, the backlash characteristics of said gearing mechanism normally preventing the second shaft position from being said predetermined ratio of the position of said first shaft, said device comprising: first means responsive to the position of said first shaft for producing a first binary number whose value represents the displacement of said first shaft, said first binary number having a first number of significant place digits; second means responsive to the position of said second shaft for producing a second binary number whose value represents the displacement of said second shaft, said second binary number having a second number of significant place digits, a predetermined number of the most significant digits of said first binary number overlapping a corresponding number of the least significant digits of said second number, said degree of overlap corresponding to the maximum backlash characteristics of said gearing mechanism; and means for combining said first and second binary numbers to form a third binary number having a third number of significant place digits representing the total displacement of said first shaft, said third binary number being corrected for the backlash effects in said second binary number as based on the difference in value between the overlapping digits of said first and second binary numbers.

18. The electronic device according to claim 17 wherein the last-named means includes, in addition, means for forming the least significant digits in said third number from said first binary number in its entirety, count forming means responsive to the difference in value of the overlapping digits of said first and second binary numbers for producing a count whose value is based on the value difference; means for modifying the remaining significant digit values of said second number based on the count produced by said count forming means; and means for employing said modified remaining significant digits of said second binary number for the remaining significant digits of said third binary number.

References Cited in the file of this patent

UNITED STATES PATENTS

| | | |
|---|---|---|
| 2,621,238 | Palmer | Dec. 9, 1952 |
| 2,729,773 | Steele | Jan. 3, 1956 |
| 2,730,698 | Daniels | Jan. 10, 1956 |
| 2,770,798 | Roth | Nov. 13, 1956 |
| 2,775,755 | Sink | Dec. 25, 1956 |
| 2,850,240 | Dickinson | Sept. 2, 1958 |
| 2,867,724 | Olson | Jan. 6, 1959 |
| 2,888,643 | Summerhayes | May 26, 1959 |
| 2,905,895 | Gordon | Sept. 22, 1959 |

OTHER REFERENCES

"Proceedings of the Institution of Electrical Engineers, Part II, #97, October 1950, pp. 550–555.

"Electrical Manufacturing," vol. 64, No. 2, August 1959, pp. 98–103.